United States Patent [19]

Adamson

[11] 4,171,520
[45] Oct. 16, 1979

[54] TRANSPONDER SYSTEM INCLUDING AN OSCILLATOR/RIPPLE COUNTER CONTROLLING A FIXED GRAY CODE LOGIC NETWORK IN CIRCUIT WITH A DRIVER/GATE CIRCUIT FOR GENERATING "RED-ALERT" END CONDITION DIGITAL SIGNALS IN A STORAGE TANK GAUGING SYSTEM

[75] Inventor: John S. Adamson, Pleasant Hill, Calif.

[73] Assignee: Chevron Research Company, San Francisco, Calif.

[21] Appl. No.: 855,032

[22] Filed: Nov. 25, 1977

[51] Int. Cl.² .................. H04Q 9/00; G08B 21/00
[52] U.S. Cl. ........................... 340/152 T; 340/203; 340/518; 340/616
[58] Field of Search ............. 340/152 T, 244 R, 203, 340/205, 2, 1 L, 181, 183, 408, 413, 207

[56] References Cited

U.S. PATENT DOCUMENTS

| | | | |
|---|---|---|---|
| 3,462,736 | 8/1969 | Hollands | 340/203 |
| 3,742,473 | 6/1973 | Hadden | 340/206 |
| 4,030,095 | 6/1977 | Dalmal | 340/413 |

Primary Examiner—Donald J. Yusko
Attorney, Agent, or Firm—R. L. Freeland, Jr.; H. D. Messner

[57] ABSTRACT

A "red-alert" end condition digital signal is generated by a transponder system of the present invention formed essentially of MSI's (Medium Scale Integrated Chips) including an oscillator/ripple counter controlling a fixed Gray code logic encoding network in circuit with a driver circuit. The aforementioned system both is initiated by and is in power dependent relationship with a MARK-SPACE interrogation signal and has special utility in digitally monitoring product "overflow" conditions in source/product storage tank networks associated with an oil refinery and/or a chemical complex.

11 Claims, 9 Drawing Figures

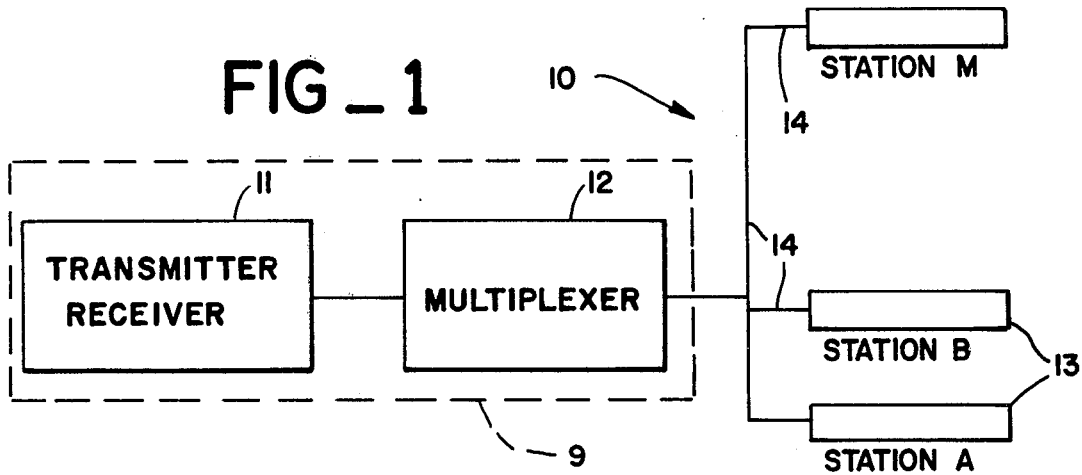
FIG_1
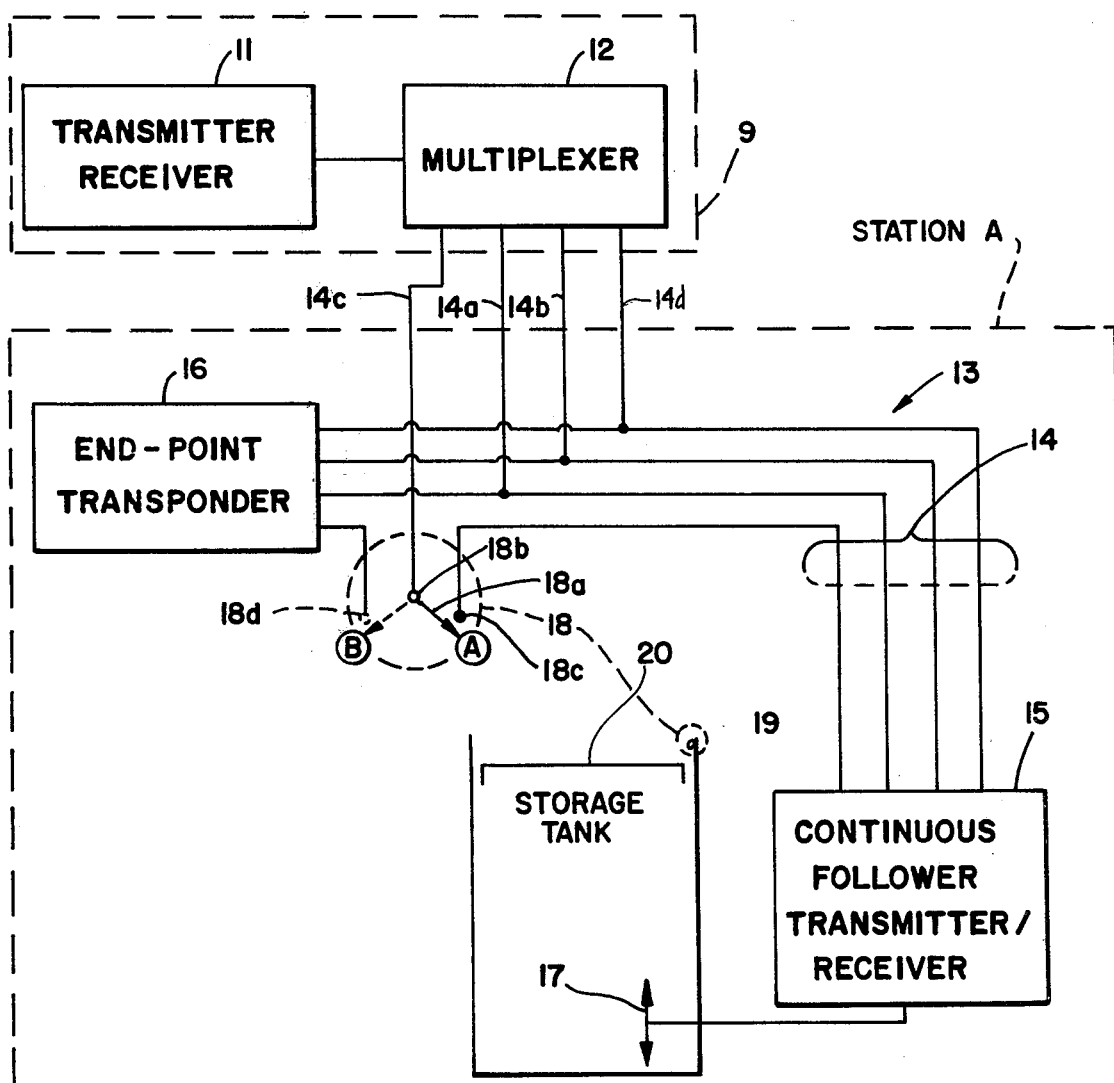
FIG_2

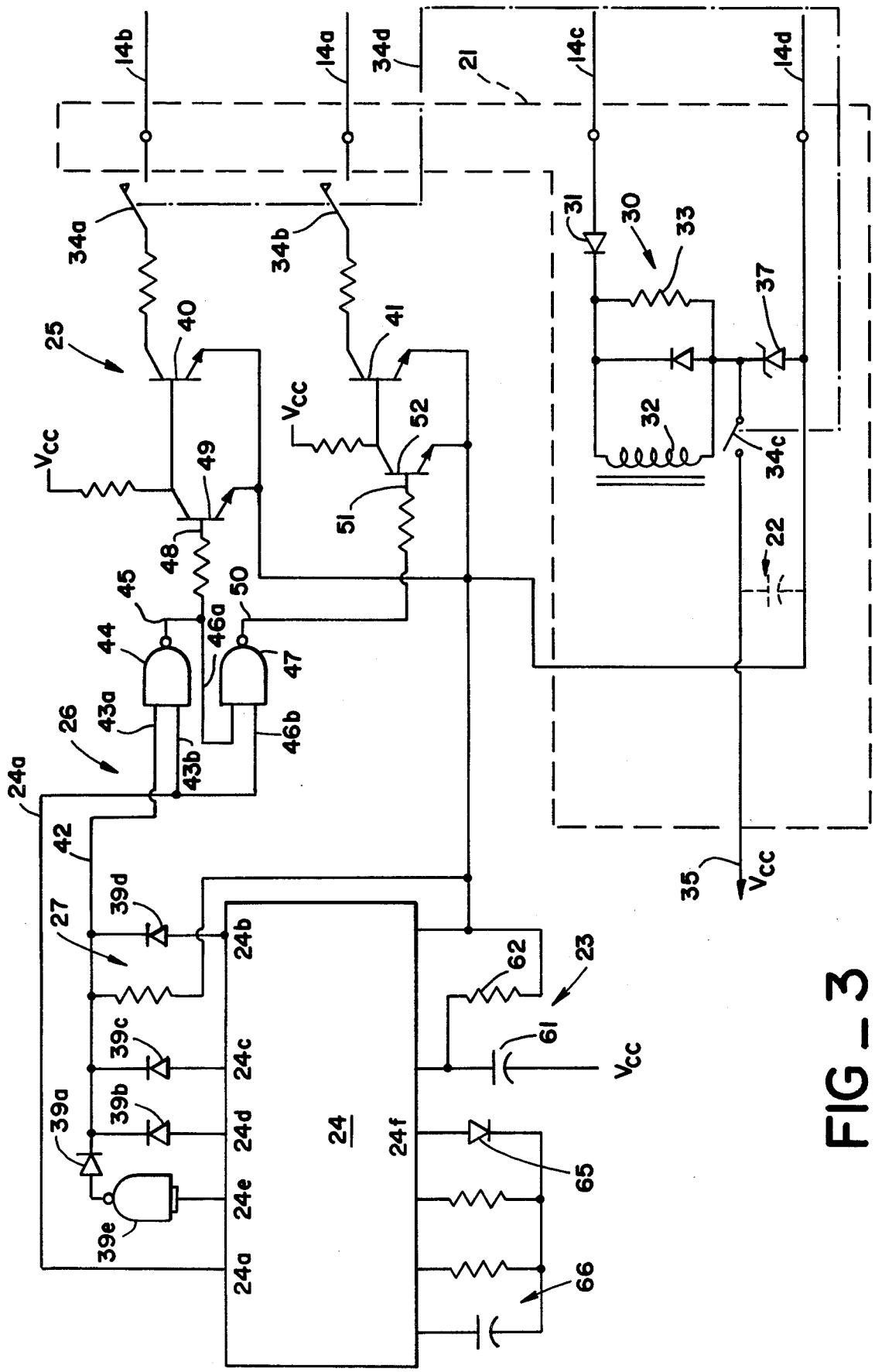
FIG_3

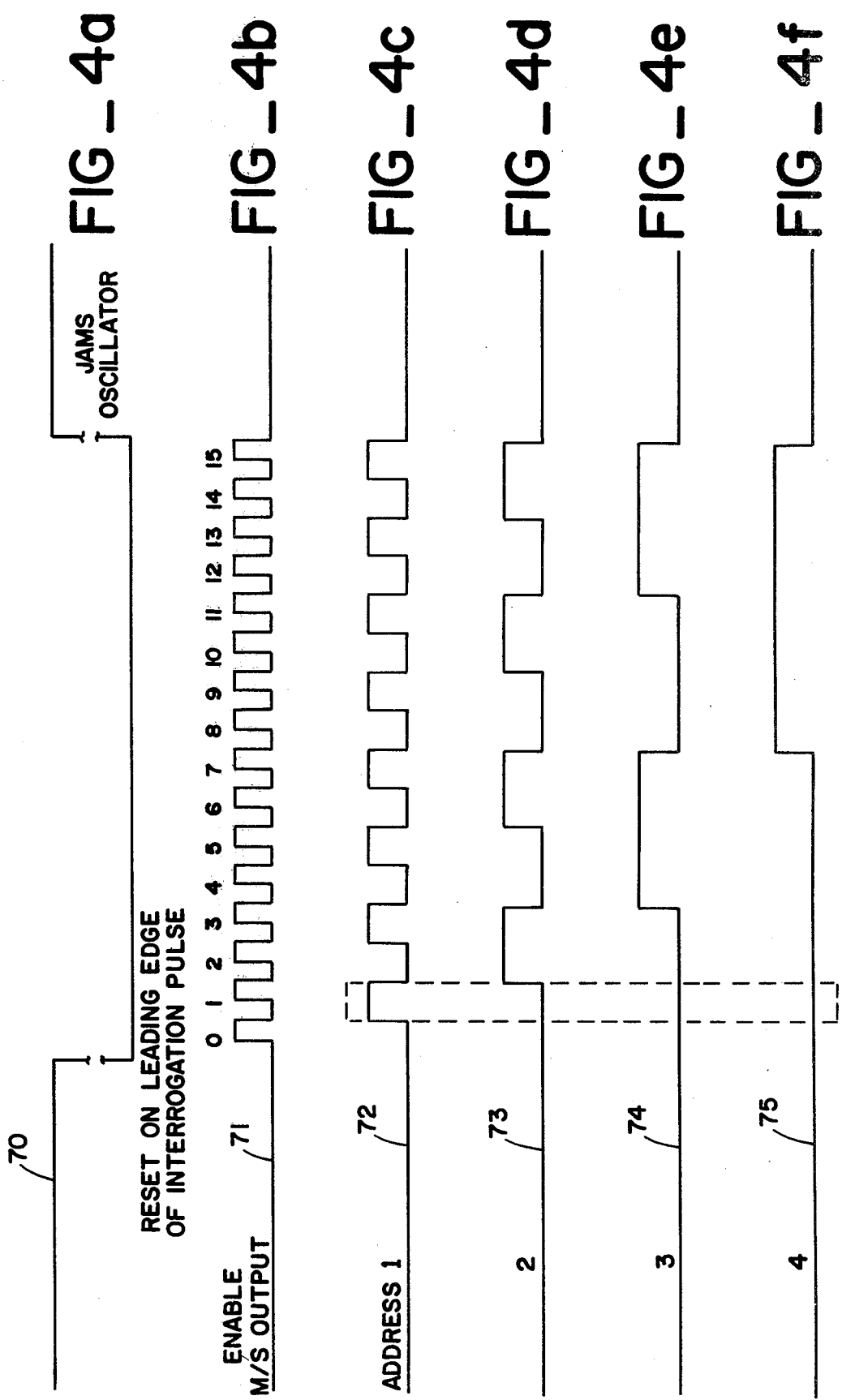

TRANSPONDER SYSTEM INCLUDING AN OSCILLATOR/RIPPLE COUNTER CONTROLLING A FIXED GRAY CODE LOGIC NETWORK IN CIRCUIT WITH A DRIVER/GATE CIRCUIT FOR GENERATING "RED-ALERT" END CONDITION DIGITAL SIGNALS IN A STORAGE TANK GAUGING SYSTEM

RELATED APPLICATIONS

Related applications assigned to the assignee of the instant application and incorporated herein by reference, all having a common filing date, include: U.S. Ser. No. 855,033. J. S. Adamson for "Transponder System Including An Oscillator Ripple Counter Controlling A Coded Analog Multiplex Network In A Circuit With A Driver/Gate Circuit For Generating "Red-Alert" End Condition Digital Signals In A Storage Tank Gauging System"; U.S. Ser. No. 854,916, J. S. Adamson for "Transponder System Including An Oscillator/Ripple Counter Controlling A Fixed Gray Code Logic Network In Circuit With A Decoder/Driver Network For Generating "Red-Alert" End Condition Digital Signals In A Storage Tank Gauging System"; and U.S. Ser. No. 854,917, J. S. Adamson for "Transducer System For Continuous Monitoring Liquid Levels In Storage Tanks And The Like".

FIELD OF THE INVENTION

This invention relates to a transponder, and more particularly, to a single cycle transponder system formed essentially of MSI's (Medium Scale Integrated Chips) in which a MARK-SPACE interrogation signal of a MARK-SPACE digital tank gauging system, both initiates and powers the transponder system to provide a unique "red-alert" digital Gray code forewarning of overflow conditions within storage vessels and the like in operative circuit therewith. The invention has particular utility in monitoring storage tank networks associated with an oil refinery and/or a chemical complex.

BACKGROUND OF THE INVENTION

In MARK-SPACE digital tank gauging systems, conductor buses directly connected all tank stations with a central control monitoring location. Individual tank stations are in multiplexed circuit connection with the central monitor. During operations, line voltage of the conductor buses must be held at a rather high level, say 48 volts, to avoid accidental tripping of the system by natural phenomenon, such as lightening. In order to create a MARK or SPACE pulse on the lines of interest, the transponder system associated therewith must pull down the MARK or SPACE line to ground potential. Experience has shown that to generate such signals by a separate transponder circuitry formed essentially of MSI's (Medium Scale Integrated Chips) where such circuits are to be formed with minimum device count, simple control capability and low power requirements is exceedingly difficult. This is especially true if the circuit of interest must also be correctly interfaced with present on-site tank gauging systems.

"Red-alert" (i.e., overflow) conditions in refineries and/or chemical complexes require the utilization of a separate end-point transponder system. This has been brought about to a large extent, by changes in Federal and State laws. While normal refining practice seeks to avoid overloading storage tanks in any storage tank network, Federal and State laws have now increased the penalties attendant such spillage (sometimes irrespective of proximate cause) such that separate end-point monitoring systems are now advisable. However, experiences show that solid state end-point transponder systems are difficult to achieve because of the reasons previously mentioned.

SUMMARY OF THE INVENTION

In accordance with the present invention, a separate, solid state, end-point transponder system is placed in circuit with a MARK-SPACE interrogation line of the MARK-SPACE tank gauging system through a "red-alert" condition switch in circuit with a relay coil. Assuming an end-point condition occurs within a storage tank, necessitating the generation of a "red-alert" MARK-SPACE Gray Code, the condition switch first changes state. Result: the high voltage MARK-SPACE interrogation signal is shuttled through to the elements of the separate transponder system of the present invention and by-passes the usual liquid level transmitter associated with each field station. Initially, the interrogation signal is fed through a surge and polarity limiting circuit to a voltage divider network connected through a power-on reset circuit to an oscillator/ripple counter controlling a fixed Gray code logic encoder in circuit with a driver circuit. A reproduction of the "red-alert" digital code of interest is generated by converting other usual address commands of the counter to a 15-in-16 address code of all LOW's and to a 1-in-16 address code containing a single HI, using a fixed logic network in combination with a pair of NAND gates connected to the driver circuit. In more detail, the power-on reset circuit first resets all output stages of the ripple counter to zero and starts the oscillator clock. As the counter ripples through a multi-stage cycle, several output stages are sequentially enabled as follows:

(i) The least significant bit, i.e., the $2^0$ bit, enables a pair of NAND gates at the highest repetition rate for the counter;

(ii) The more intermediate address bits, say the $2^1$, $2^2$, $2^3 \ldots 2^N$ bits activate the hard-wired logic network — in binary combinations —that are then transcribed (from usual address commands) for driving the remaining input of one of the NAND gates of (i). The hard-wired logic network includes a network of diodes and an invertor at the output of the counter. The logic network itself also has a common output to one of a pair of cascading NAND gates, the outputs which modulate —through a driver network —the SPACE-MARK lines akin to a 16×1 ROM in which the logic network in combination with the NAND gates provides only a 1-in-16 particular address for enabling the MARK line, and 15-in-16 addresses for enabling the SPACE line. Thus, enablement of the MARK line can take place once only each cycle. In that way, as the counter strobes the logic network, say 16 times per cycle, only one of the cycles produces a MARK pulse at the output of the driver network. The result is the Gray code of interest: 0100 0000 0000 0000.

(iii) The most significant bit, i.e., the $2^{N+1}$ bit of the counter, is fed back to an RC input circuit, driving a diode into conduction in circuit with the oscillator clock which jams the latter. All operations cease.

DESCRIPTION OF THE DRAWINGS

Further features of the invention will become more apparent upon consideration of the following detailed descriptions of the invention when taken in conjunction with the accompanying drawings, wherein:

FIG. 1 is a schematic of a tank gauging system servicing —from a central monitoring location —a plurality of field stations A,B . . . M;

FIG. 2 is a schematic diagram illustrating in some detail a transponder system in the present invention linked —electrically —to the tank gauging system of FIG. 1;

FIG. 3 is yet another schematic diagram illustrating in still more detail transponder system of FIG. 2; and FIGS. 4a–f are timing charts of sets of square wave pulses generated by the system of FIG. 3.

EMBODIMENTS OF THE INVENTION

Reference should now be had to FIG. 1 which is a schematic diagram of a digital tank gauging system 10 modified in accordance with the present invention.

As shown, system 10 includes a transmitter-receiver 11 and multiplexer 12 located at a central station 9. Receiver-transmitter 11 and multiplexer 12 are in circuit with each other and, in addition with a plurality of field transmitter-receiver networks 13. The latter are located, i.e., positioned within, a series of tank monitoring stations, A,B . . . M and connect to the former through a series of MARK-SPACE conductor buses 14.

Each field transmitter-receiver network 13 at each of the different monitoring station A,B . . . M, is individually interrogated in sequence by the receiver-transmitter 11 and multiplexer 12 operating at the central station 9. In more detail, the transmitter-receiver 11 and multiplexer 12 interrogate each individual station A,B . . . M through the emission of a predetermined MARK-SPACE interrogation signal. The last-mentioned signal is usually designed to have a high relative amplitude, say 48 volts d.c., to avoid accidental tripping of the system. It is also uniquely codable vis-a-vis station A,B . . . or M. In response to such signal, a MARK or SPACE bit code, in turn, is generated by the appropriate network 13. Its duration and polarity differs, however, than that of the interrogation signal in that it must pull down the MARK or SPACE line to ground potential and its pulse width, while common to other MARK or SPACE pulses, is much smaller than that of the interrogation pulse. To generate such signals using MSI's (Medium Scale Integrated Chips) within each network 13, however, has been found to be exceedingly difficult in practice to accomplish, as previously mentioned.

FIG. 2 shows a field transmitter-receiver network 13 in more detail.

As shown, network 13 includes a continuous follower transmitter-receiver (TR) 15 in circuit with an end-point transponder system 16 in the present invention. All control and data signals enter and leave TR circuit 15 and transponder system 16 via elements of the conductor buses 14 previously mentioned to separately control and interact with condition sensors 17 and 18.

Note that the TR circuit 15 and transponder system 16 separately but alternately utilize the sensors 17 and 18. There are similarities, however between them, such as the sensors 17 and 18 both being located within storage tank 19.

In operation, sensor 17 provides a drive signal to the transmitter-receiver circuit 15 proportional to liquid level such sensor 17 being a float and rotary digital encoder, or the like, well known in the art; while sensor 18 can be an end-point condition switch having two positions: an inactive or passive position A in which arm 18A contacts terminals 18B and 18C, and an enable or active position B in which arm 18A links terminals 18B and 18D, as shown in phantom line.

In position A, TR circuit 15 is placed in electrical linkage with multiplexer 12 whenever the corrected addressed interrogation signal is generated therefrom. It is fed thereto via interrogation line 14c. Note that line 14C can also be linked to the end-point transponder 16 depending on the "state" of the condition switch 18. In either "position", switch 18 does not, however, effect data being fed via MARK line 14A or SPACE line 14B, vis-a-vis central station 9.

Position B occurs when "red-alert" (i.e., overflow) conditions are imminent, end-point condition switch arm 18A being tripped, through appropriate mechanical rotation as, say as a functional movement of floating roof 20 of tank 19. I.e., as roof 20 reaches a predetermined position, the condition switch arm 18A can be mechanically rotated from position A to position B. Result: the end-point transponder system 16 of the present invention is placed in circuit with multiplexer 12 at the central station 9.

FIG. 3 illustrates the transponder system 16 of the present invention in more detail.

As shown, I/O network 21 initiates operations whenever the correctly addressed interrogation signal (via interrogation line 14C) is received from the central station 9. Within the I/O 21 is a voltage divider 22 which aids in generating a power-on-reset pulse at power-on-reset network 23 of oscillator/ripple counter 24 as well as drive voltage $V_{CC}$ for the counter 24 and driver network 25 in circuit with oscillator/counter 24 through a NAND gate network 26 and hard-wired logic network 27.

Briefly, in operation, the interrogation voltage pulse is divided via the voltage diode 22 comprising parallel relay coil 32 and resistor 33 in circuit with Zenor diode 37, the coil 32 and resistor 33 acting as a limited current source for the diode 37, the Zenor diode 37 acting as a voltage regulator to develop system voltage Vcc. The leading edge of the divided pulse is used in power-on-reset network 23 at the input of the oscillator/ripple counter 24 as follows: it first resets all output stages 24B–24E to zero and then starts the oscillator clock to initiate system operations. As a result, a series of sequential binary "addresses" are generated which enable, in sequence, a series of inputs to the hard-wired logic network 27 in series with the pair of cascaded NAND gates 44,47. The logic network 26 and the NAND gates together form a fixed Gray encoder network, and provide at the output thereof, a reproduction —at microcircuit input levels —of the "red-alert" code of interest. Such reproduction is fed to driver network 25. The resulting code of interest created at driver network 25, being at microcircuit voltage and current levels, as previously mentioned, must be increased to a level which is compatible with conventional tank gauging systems. To generate a compatible code, each microcircuit pulse (either a SPACE or MARK) controls a switching transistor 40 or 41 connected to SPACE or the MARK lines 14B or 14A of the conventional tank gauging system. Result: the "red-alert" code of interest can be transmitted back to the central station through I/O 21 for display and analysis.

Cyclic operations of the oscillator/ripple counter 24, NAND gate network 26, logic network 27, and driver network 25 is summarized and set forth below in Table I. Note the fixed Gray code transmitted —ultimately —is 0100 0000 0000 0000. Base ten translation: 79.99.

TABLE I

| Ripple Counter Disable $2^{N+1}$ Bit | Data $2^N...2^2$ $2^1$ Bits | Output Enable $2^0$ Bit | NAND Gate Logic Translation Network Comment |
|---|---|---|---|
| 0 | 0000 | 0 | Reset & start at Address 0 |
| 0 | 0000 | 1 | SPACE gate enabled at Address 0 |
| 0 | 0001 | 0 | Set to Address 1 |
| 0 | 0001 | 1 | MARK gate enabled at Address 1 |
| 0 | 0010 | 0 | Set to Address 2 |
| 0 | 0010 | 1 | SPACE gate enabled at Address 2 |
| 0 | 0011 | 0 | Set to Address 3 |
| 0 | 0011 | 1 | SPACE gate enabled at Address 3 |
| 0 | 0100 | 0 | Set to Address 4 |
| 0 | 0100 | 1 | SPACE gate enabled at Address 4 |
| 0 | 0101 | 0 | Set to Address 5 |
| 0 | 0101 | 1 | SPACE gate enabled at Address 5 |
| 0 | 0110 | 0 | Set to Address 6 |
| 0 | 0110 | 1 | SPACE gate enabled at Address 6 |
| 0 | 0111 | 0 | Set to Address 7 |
| 0 | 0111 | 1 | SPACE gate enabled at Address 7 |
| 0 | 1000 | 0 | Set to Address 8 |
| 0 | 1000 | 1 | SPACE gate enabled at Address 8 |
| 0 | 1001 | 0 | Set to Address 9 |
| 0 | 1001 | 1 | SPACE gate enabled at Address 9 |
| 0 | 1010 | 0 | Set to Address 10 |
| 0 | 1010 | 1 | SPACE gate enabled at Address 10 |
| 0 | 1011 | 0 | Set to Address 11 |
| 0 | 1011 | 1 | SPACE gate enabled at Address 11 |
| 0 | 1100 | 0 | Set to Address 12 |
| 0 | 1100 | 1 | SPACE gate enabled at Address 12 |
| 0 | 1101 | 0 | Set to Address 13 |
| 0 | 1101 | 1 | SPACE gate enabled at Address 13 |
| 0 | 1110 | 0 | Set to Address 14 |
| 0 | 1110 | 1 | SPACE gate enabled at Address 14 |
| 0 | 1111 | 0 | Set to Address 15 |
| 0 | 1111 | 1 | SPACE gate enabled at Address 15 |
| 1 | 0000 | 0 | Clock jammed; operations cease |

Having briefly described operations via Table I above, a more detailed analysis of I/O 21 is in order and is presented below.

As shown in FIG. 3, I/O 21 includes a surge and polarity limiting circuit 30 at its input. The circuit 30 comprises a reverse polarity protection diode 31. A relay coil 32 is in circuit with the diode 31 through surge limiting resistor 33. In operation, the diode 31 only conducts when an interrogation signal of the correct polarity as applied to the I/O 21. Note that the interrogation signal not only energizes the relay coil 32 (closing relay contacts 34A–34C through linkage 34D) but it also powers the remainder of the system via power bus 35 and voltage divider 22. The voltage divider 22 is common in the art and reduces the voltage of the interrogation pulse via resistor 33 and Zener diode 37 to a level compatible with microcircuit logic, e.g., say at about 9 volts in the instant application. With the closing of relay contacts 34B and 34C, note the driver network 25 of FIG. 3 is placed in circuit with output data MARK and SPACE bus lines 14A and 14B, respectively, to generate the Gray code ("red-alert") of interest.

Gray code generation can be further explained with reference to Gray code logic network 27 in circuit with NAND gate network 26 of FIG. 3.

As shown, logic network 27 includes a series of diodes 39A–39D as well as inverting gate 39E terminating in a common data bus 42. The bus 42, in turn, connects to input 43A of NAND gate 44, gate 44 also having an output 45 common to input 46A of NAND gate 47, as well as to the base 48 of bipolar transistor 49. Remaining inputs 43B and 46B of NAND gates 44 and 47, respectively, connect to the $2^0$, bit output stage 24A of counter 24. NAND gate 47 has an output 50 connected to the base 51 of bipolar transistor 52.

As proper bit codes (HI's and LOW's) appear at base 48, or 51, transistor 49 or 52, respectively, is enabled allowing switching transistor 40 or 41 to conduct. Result: the MARK or SPACE line at the output of transistors 40 or 41, is pulled down —momentarily —to ground potential generating the "red-alert" code of interest.

Return to FIG. 3 to review the operational aspects of the transponder system 16 of the present invention.

Note initially the effect of the interrogation pulse of the I/O 21 on operations of power-on-reset network 23 of oscillator/counter 24 whereby the leading edge of the dc input generates a power-on-clear pulse for the oscillator/counter 24 through capacitor 61 in circuit with resistor 62.

Not only are all output stages 24B–24E of the counter 24 set to zero by such pulse, but also the latter initiates operation of the oscillator clock. As the counter 24 ripples through a single cycle, individual output stages 24A–24E are activated to controllably enable driver network 25 through the NAND gate network 26 and hard-wired logic network 27, as explained above.

E.g., the least significant bit, say the $2^0$ bit of the counter 24, can be utilized to selectively enable NAND gates 44,47 via their inputs 43B and 46B, respectively, while intermediate bits $2^1, 2^2...2^N$ bits use data bus 42 connected to input 43A of the NAND gate 44 only. Since logic 27 includes the parallel-series network of diodes 39A–39D as well as inverter 39E, as a result, a MARK is only created when the data code is 10000 and the enable bit is HI, as previously indicated. That is to say, the SPACE-MARK lines are modulated akin to a 16×1 ROM in which a 1-in-16 particular address enables the MARK line while 15-in-16 address enable the SPACE line. Thus, enablement of the MARK line can take place only once each cycle. Result: as a consequence of operation of the logic network 27 and NAND gate network 26, either a synthetic MARK or a SPACE microcircuit pulse is generated at the respective outputs 45,50 of the NAND gates 44,47, respectively. These pulses in turn, are regenerated via driver network 25, as explained in detail above, to levels compatible with conventional tank gauging systems. The resulting digital "red-alert" code on MARK-SPACE bus line 14A,14B is displayed at the central station. Such code can trigger an audio or visual alarm at the central station to warn of imminence of overflow conditions of interest.

In more detail, as a selected bit code (HI's and LOW's) as dictated by the fixed logic of network 27 appears at the outputs 45,50 of the NAND gates 44,47, respectively, the transistors 40, 41, 49, 52 selectively operate to pull down the MARK or SPACE line to ground potential. Result: MARK or SPACE pulses are generated.

For example, as a LOW appears at output 45 of NAND gate 44, transistor 49 is deactivated; while its collector attempts to go HI, the collector current is diverted to the base of power transistor 40, causing conduction. Hence, SPACE line 14B is brought down to ground potential creating a SPACE on that line. Note with a LOW at output 45 of gate 44 that companion NAND gate 47 is inhibited, and thus, its output remains HI.

On the other hand, if a HI appears at output 45 of the NAND gate 44, transistor 49 conducts but power transistor 40 is open circuited. Note that simultaneously a LOW appears at output 50 of NAND gate 47 (because of its feedback relationship with NAND gate 44). As a result, bipolar transistor 52 is open circuited, and power transistor 41 is momentarily activated. Hence, a "MARK" appears on MARK line 14A.

The most significant bit of the oscillator/counter 24 say the $2^{N+1}$ bit is last fed via bus 24F back to the diode 65 at the input to the oscillator/counter 24 (i.e., to RC circuit 66). In operation, conduction of the diode 65 "jams" the oscillator clock. All output stages of the oscillator/counter are then placed in an inhibited state. All operations cease.

The synthetic Gray code generation can be further explained with reference to the timing chart of FIG. 4.

As shown, the pulse width of interrogation signal 70 of FIG. 4A is such that usually a certain total of MARK and SPACE pulses, say sixteen, can be provided per interrogation cycle. Hence, the number and pulse width of the enable ($2^0$) pulses of the pulse code 71 of FIG. 4B for NAND gate network 26 would correspond in kind to the MARK and SPACE pulses ultimately generated and displayed. I.e., the square wave enabling ($2^0$) code 71 would have a repetition rate and pulse width matchable in kind to the MARK and SPACE pulses generated by the driver network 25 of FIG. 3. This is not true for the address command codes 72, 73, 74 and 75, of FIG. 4C-4F. Each is initiated by the falling edge of the initial pulse of the preceeding set of square wave address pulses and has progressively increasing pulse width and correspondingly a progressively decreasing repetition rate. Note all codes 71–75 as well as the disabling bit terminate coincident with the trailing edge of the interrogation pulse 70 of FIG. 4A.

From the above, it is apparent that the invention as hereinbefore described has variations readily apparent to those skilled in the art and hence the invention is not limited to the combination of embodiments hereinbefore described but should be given the broadest possible interpretation in the terms of the following claims.

What is claimed is:

1. Transponder network for generating a "red-alert" digital code upon (i) occurrence of an overflow condition within a storage tank under survey and (ii) receipt of a square wave interrogation signal from a transmitter/receiver of a tank gauging system located at a central station remote from said storage tank but electrically connected to said transponder network through an INTERROGATION, a MARK and a SPACE line of said tank gauging system, comprising:
   (A) I/O network for receiving said interrogation signal including voltage divider means for generating a microcircuit drive voltage for a period concident with the pulse width of said interrogation signal;
   (B) an oscillator/ripple counter formed essentially of MSI's connected to said I/O network and including at an input, a power-on-reset network for generating a reset pulse for said oscillator/ripple counter, said oscillator/ripple counter generating, in response to said reset pulse, sets of square wave pulses of differing repetition rates and pulse widths;
   (C) an encoding means and NAND gate means connected to each other and to (B) responding to selected sets of said square wave pulses to generate a synthetic digital code at microcircuit signal levels at an output means of said gate means;
   (D) drive means including switching transistor means having one or more inputs connected to said NAND gate means of (C), and one or more output means connected to said MARK and SPACE lines through said I/O of (A), said drive means being controllable as a function of said synthetic digital code to drive said MARK and SPACE lines between tank gauging operating potentials for generating said "red-alert" digital code of interest at said central station whereby said overflow condition within said storage tank can be indicated.

2. The transponder system of claim 1 in which an initial first generated set of square wave pulses by (B) is characterized by a repetition rate higher than those of subsequent sets of square wave pulses, for enabling said NAND gate means of (C) at said same repetition rate, and generating said synthetic digital code at microcircuit signal levels.

3. The transponder system of claim 2 in which each subsequent set of generated sets of square wave pulses provide in combination a series of address commands for said encoder of of (C) whereby only a 1-in-16 particular address command per interrogation cycle enables said NAND gate means in circuit with MARK line through said drive means and 15-in-16 address commands per cycle enable said SPACE line whereby said synthetic code is generated.

4. Transponder system of claim 3 in which said encoding means is a hard-wire of parallel-coupled diodes and an invertor connected to respective output stages of said oscillator/counter.

5. Transponder system of claim 4 in which said encoding network also has a common output for said diodes and invertor connected to said NAND gate means.

6. Transponder system of claim 1 in which (A) includes a polarity protection network in circuit with said INTERROGATION line of said tank gauging system.

7. Transponder system of claim 1 in which (D) includes a surge limiting network in circuit with said MARK and SPACE lines of said tank gauging system through (A).

8. Method for generating a "red-alert" digital code upon (i) occurrence of an overflow condition within a storage tank under survey and (ii) receipt of a square wave interrogation signal from a transmitter/receiver of a tank gauging system located at a central station remote from said storage tank but electrically connected to said transponder network through an interrogation, a MARK and a SPACE line of said tank gauging system, comprising the steps of:
   (A) from said interrogation signal, generating a microcircuit drive voltage for a period coincident with the pulse width of said interrogation signal;

(B) generating sets of square wave pulses of differing repetition rates and pulse widths;

(C) in response to selected sets of said square wave pulses of (B), logically forming and gating first and second enabling address codes to said MARK and SPACE lines, respectively, so as to generate a synthetic digital code at microcircuit signal levels;

(D) as a function of said synthetic digital code driving said MARK and SPACE lines between tank gauging operating potentials for generating said "red-alert" digital code of interest at said central station whereby said overflow condition within said storage tank can be indicated.

9. Method of claim 8 in which said first enabling address code is a fixed 1-in-16 MARK line address code and in which said second enabling address code is a fixed 15-in-16 SPACE line address code.

10. Method of claim 8 in which said each subsequent generated set of square wave pulses of (B) is initiated in coincidence with a trailing edge of an initially generated pulse of said succeeding set of pulses, but all sets terminate in coincidence with termination of said interrogation signal.

11. Method of claim 8 in which an initial first generated set of square wave pulses of (B) is characterized by a repetiton rate higher than those of subsequent sets of square wave pulses, for generating said address enabling code, whereby said synthetic digital code at microcircuit signal levels can be generated.

* * * * *